US012578306B2

(12) United States Patent
Ewing et al.

(10) Patent No.: US 12,578,306 B2
(45) Date of Patent: Mar. 17, 2026

(54) ION EXTRACTION AND FOCUSING FROM A FIELD-FREE REGION TO AN ION MOBILITY SPECTROMETER AT ATMOSPHERIC PRESSURE

(71) Applicant: Battelle Memorial Institute, Richland, WA (US)

(72) Inventors: Robert G. Ewing, Kennewick, WA (US); Elizabeth Denis, Seattle, WA (US); Megan Nims, Richland, WA (US); Garret L. Hart, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 628 days.

(21) Appl. No.: 17/880,232

(22) Filed: Aug. 3, 2022

(65) Prior Publication Data

US 2024/0044840 A1     Feb. 8, 2024

(51) Int. Cl.
*G01N 27/622* (2021.01)

(52) U.S. Cl.
CPC ................................ *G01N 27/622* (2013.01)

(58) Field of Classification Search
CPC .... G01N 27/622; G01N 27/623; G01N 27/49; H01J 49/401; H01J 49/4235; H01J 49/062; H01J 49/065
See application file for complete search history.

(56) References Cited

U.S. PATENT DOCUMENTS

| | | | | |
|---|---|---|---|---|
| 4,023,398 | A | * | 5/1977 | French ................. H01J 49/067 |
| | | | | 250/281 |
| 5,491,337 | A | | 2/1996 | Jenkins et al. |
| 10,458,945 | B2 | * | 10/2019 | Piper .................... G01N 27/622 |
| 2005/0167587 | A1 | * | 8/2005 | Guevremont ........ G01N 27/624 |
| | | | | 250/281 |

(Continued)

FOREIGN PATENT DOCUMENTS

| | | | | | |
|---|---|---|---|---|---|
| CN | 112820621 | A | * | 5/2021 | .......... H01J 49/0031 |
| CN | 115483088 | A | * | 12/2022 | .......... H01J 49/0468 |

(Continued)

OTHER PUBLICATIONS

Guevremont (Year: 1999).*

(Continued)

*Primary Examiner* — Wyatt A Stoffa
*Assistant Examiner* — Laura Eloise Tandy
(74) *Attorney, Agent, or Firm* — Klarquist Sparkman, LLP

(57) ABSTRACT

Apparatus include a plurality of electrodes arranged in a sequence along a propagation axis between an ion inlet and an ion outlet to define an ion path and volume, wherein the electrodes are configured to receive respective voltages to produce an electric field in the volume that urges ions to propagate along the ion path downstream towards the ion outlet, wherein the sequence includes at least a first sequence portion including first and last electrodes configured to receive voltages according to a first function, and including at least one intermediate electrode situated between the first (Continued)

and last electrodes wherein the at least one intermediate electrode is configured to receive a voltage defining a voltage dip relative to the first function. Atmospheric flow tubes include a tube body and a central electrode.

37 Claims, 9 Drawing Sheets

(56) References Cited

U.S. PATENT DOCUMENTS

| | | | | |
|---|---|---|---|---|
| 2006/0076484 A1 * | 4/2006 | Brown | .................. | H01J 49/062 |
| | | | | 250/290 |
| 2006/0151694 A1 * | 7/2006 | Guevremont | ........ | G01N 27/624 |
| | | | | 250/291 |
| 2020/0258734 A1 | 8/2020 | Denis et al. | | |
| 2022/0406588 A1 * | 12/2022 | Miura | .................. | H01J 49/408 |

FOREIGN PATENT DOCUMENTS

| | | | | | |
|---|---|---|---|---|---|
| DE | 10335836 B4 | * | 6/2011 | .......... | H01J 49/4225 |
| GB | 2595226 A | * | 11/2021 | .......... | H01J 49/0027 |

OTHER PUBLICATIONS

You Espacenet translation (Year: 2021).*
Miura Espacenet translation (Year: 2022).*
Bateman (Year: 2004).*
Espacenet translation (Year: 2022).*
Espacenet translation (Year: 2021).*
Iyer et al., "Ion Manipulation in Open Air Using 3D-Printed Electrodes," *Journal of the American Society for Mass Spectrometry*, 10 pages (Nov. 2019).
McGann, "New high-efficiency ion-trap mobility detection system for narcotics," *Proceedings SPIE 2397, Chemistry-and Biology-Based Technologies for Contraband Detection*, https://doi.org/10.1117/12.266761, 12 pages (Feb. 17, 1997).

* cited by examiner

700

702

Propagate ions through atmospheric flow tube

Apply time varying voltage to center electrode to reduce an ion loss

704

Apply one or more voltage dips to one or more electrodes of a set of electrodes providing a field gradient to received ions

706

708

Direct ions through transmissive electrode

Receive ions with a downstream ion analysis device

710

ION EXTRACTION AND FOCUSING FROM A FIELD-FREE REGION TO AN ION MOBILITY SPECTROMETER AT ATMOSPHERIC PRESSURE

ACKNOWLEDGMENT OF GOVERNMENT SUPPORT

This invention was made with Government support under Contract No. DE-AC05-76RL01830 awarded by the U.S. Department of Energy. The Government has certain rights in the invention.

FIELD

The field is ion manipulation.

BACKGROUND

Increased ion-molecule reaction time has been found to significantly improve to the performance of atmospheric flow tube-mass spectrometry (AFT-MS). AFT-MS has demonstrated revolutionary low detection limits enabling vapor detection (low parts-per-quadrillion levels) of explosives, drugs, and other substances. Increases in sensitivity can be obtained in the flow tube with ion residence times of a few seconds, thereby providing a significant increase in the number of ion-molecule collisions compared to common mass spectrometry systems with millisecond reaction times. However, during this slower ion transit time a substantial number of ions are lost causing an overall reduction in the total ion signal. Thus, ion loss and related degradation of an ion detection signal is a significant problem in ion mobility spectrometry and mass spectrometry, generally presenting a ceiling on device performance and preventing the extension of ion analysis techniques to a broader range of applications. A need remains for improved apparatus and techniques.

SUMMARY

According to an aspect of the disclosed technology, apparatus include a plurality of electrodes arranged in a sequence along a propagation axis between an ion inlet and an ion outlet to define an ion path and volume, wherein the electrodes are configured to receive respective voltages to produce an electric field in the volume that urges ions to propagate along the ion path downstream towards the ion outlet, wherein the sequence includes at least a first sequence portion including first and last electrodes configured to receive voltages according to a first function wherein either (i) at least the first electrode of the sequence receives a positive voltage and the first function decreases to become less positive or (ii) the first electrode of the sequence receives a negative voltage and the first function increases to become less negative, and including at least one intermediate electrode situated between the first and last electrodes wherein the at least one intermediate electrode is configured to receive a voltage defining a voltage dip relative to the first function and comprising either, (i) where the first electrode receives a positive voltage, a lesser voltage than a voltage according to the first function at the intermediate electrode position, or, (ii) where the first electrode receives a negative voltage, a greater voltage than the voltage according to the first function at the intermediate electrode position. In some examples, the voltage defining the voltage dip is configured to increase a signal strength for detection of ions that exit the outlet and are received by a downstream ion analyzing device. Some examples further include a tube body extending from one or more flow tube inlets to a flow tube outlet and defining a flow tube volume extending along a flow tube axis, wherein the one or more flow tube inlets are configured to direct gas and ions into the flow tube volume and wherein the flow tube outlet is coupled to the sequence of electrodes through the ion inlet. In some examples, the tube body and the first electrode of the plurality of electrodes are configured to receive a common voltage. In some examples, the tube body comprises the first electrode of the plurality of electrodes. Some examples further include a central electrode arranged longitudinally along the flow tube axis and configured to receive a time varying voltage configured to reduce a loss of ions as the gas and ions flow along the flow tube volume to the flow tube outlet. In some examples, the central electrode comprises a wire electrode. In some examples, the time varying voltage comprises a square wave. In some examples, the time varying voltage comprises a having equal time-voltage area products above and below a voltage applied to the tube body. In some examples, the waveform is asymmetrically shaped with respect to the voltage applied to the tube body. Some examples further include one or more ion sources coupled to respective ones of the flow tube inlets. In some examples, the first and last electrodes of the first sequence portion comprise a first sequential electrode and a third sequential electrode, and the at least one intermediate electrode of the first sequence portion comprises a second sequential electrode. In some examples, the first electrode of the first sequence portion corresponds to the first electrode of the sequence situated at or near the ion inlet, or the first electrode of the first sequence portion corresponds to another electrode of the sequence situated downstream from the first electrode of the sequence. Some examples further include at least one additional sequence portion including first and last additional electrodes configured to receive voltages according to the first function and including at least one additional intermediate electrode situated between the first and last additional electrodes wherein the at least one additional intermediate electrode is configured to receive a voltage defining a voltage dip relative to the first function. In some examples, the last electrode of the first sequence portion and the first additional electrode of the additional sequence portion are the same electrode. Some examples further include a transmissive electrode positioned downstream from the at least one intermediate electrode of the first sequence portion, wherein the transmissive electrode extends laterally with respect to the propagation axis across the volume to define a planar electric field across the volume. In some examples, the transmissive electrode comprises a mesh, screen, or grid. In some examples, the transmissive electrode comprises a pattern of polygonal shapes. In some examples, the transmissive electrode is coupled to or contiguous with the last electrode of the first sequence portion. In some examples, the transmissive electrode is configured to receive an alternative voltage and operate as an ion shutter that prevents ions from propagating downstream from the transmissive electrode. In some examples, the transmissive electrode is configured to receive the voltage according to the first function according to its position in the sequence so as to produce the planar electric field across the volume and thereby increase a signal strength for detection of ions that exit the outlet and are received by a downstream ion analyzing device. Some examples further include an ion detector coupled to the ion outlet. In some examples, the first function comprises a linear function. Some examples further include one or more voltage sources configured to provide the voltages applied to the plurality of electrodes. In some examples, the voltage dip is configured to extract ions from a position upstream from the at least one intermediate electrode of the first sequence portion by projecting electrical field lines upstream to a field free region. In some examples, the voltage dip is configured to direct the ions towards the propagation axis as the ions are urged along the ion path. In some examples, the sequence of electrodes comprises a drift tube of an ion mobility spectrometer. In some examples, the sequence that is not one of the at least one intermediate electrodes has a voltage applied according to the first function.

According to another aspect of the disclosed technology, an atmospheric flow tube includes a tube body extending from one or more flow tube inlets to a flow tube outlet and defining a flow tube volume extending along a flow tube axis, wherein the one or more flow tube inlets are configured to direct gas and ions into the flow tube volume, and a central electrode arranged longitudinally along the flow tube axis and configured to receive a time varying voltage configured to reduce a loss of the ions as the gas and ions flow along the flow tube volume to the flow tube outlet. In some examples, the central electrode comprises a wire electrode. In some examples, the time varying voltage comprises a square wave. In some examples, the time varying voltage has equal time-voltage area products above and below a voltage applied to the tube body. In some examples, the waveform is asymmetrically shaped with respect to the voltage applied to the tube body. Some examples further include one or more ion sources and/or gas sources coupled to respective ones of the flow tube inlets. In some examples, the flow tube outlet is configured to couple to an ion analyzing device. In some examples, the flow tube outlet is configured to couple to an ion mobility spectrometer. In some examples, the tube body and a first electrode of the ion mobility spectrometer or ion analyzing device are configured to receive a common voltage.

The foregoing and other objects, features, and advantages of the disclosed technology will become more apparent from the following detailed description, which proceeds with reference to the accompanying figures.

DETAILED DESCRIPTION

Introduction to the Disclosed Technology

Figure 1A:
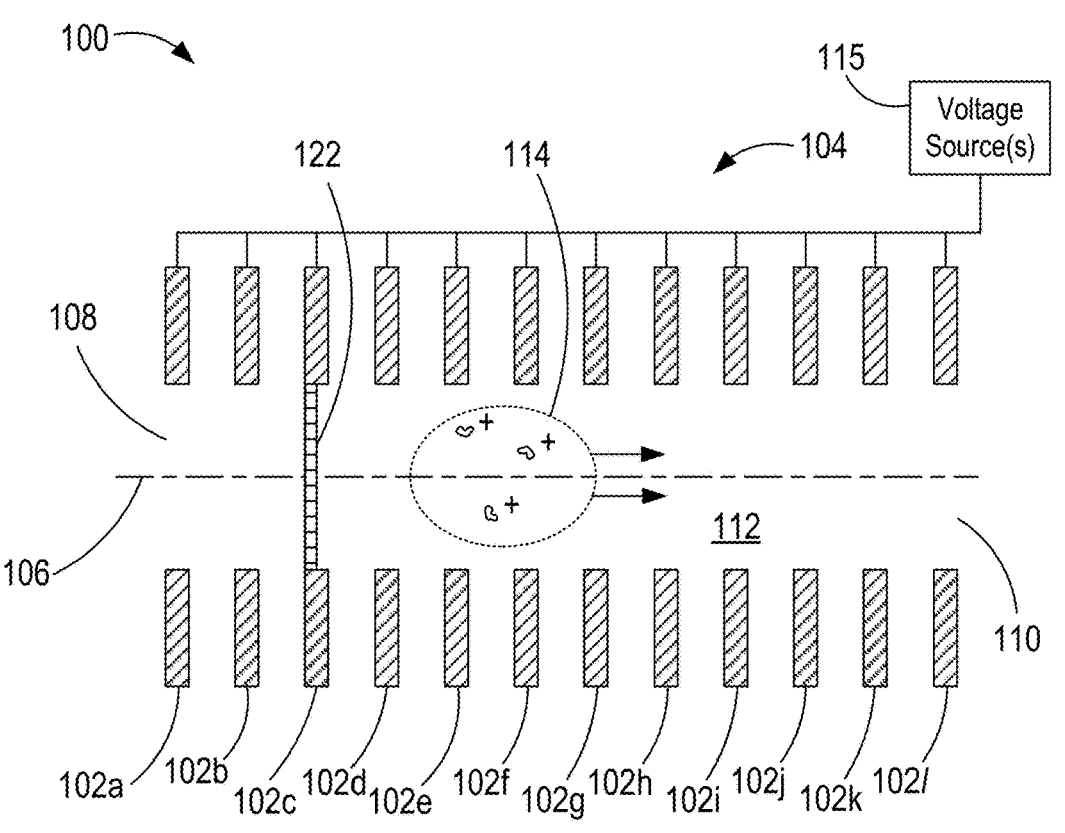
FIG. 1A is a side cross-sectional view of an electrode sequence of an ion mobility spectrometry (IMS) instrument.

Disclosed apparatus and techniques are directed to improving ion movement at atmospheric pressure and can be used to enhance ion signal and reduce ion loss for mass spectrometry (MS) and ion mobility spectrometry (IMS). For example, ion manipulation at atmospheric pressure can reduce the ion loss either along the flight path or by concentrating ions at the orifice to the mass spectrometer or another downstream detection device. In many examples, atmospheric flow tubes (AFTs) are used, and ions are manipulated (e.g., extraction, focusing, and confinement) at atmospheric pressure. In selected examples, two main ion manipulation system components are used to increase ion signal and reduce ion loss. An AFT can be combined with an IMS in such a way in which electric field gradients between the AFT and IMS are adjusted to improve ion extraction and/or ion focusing at atmospheric pressure. Separately or in addition, signal improvement is obtained by modifying an AFT to include an electrode arranged down a center of the length of the tube and applying a time varying voltage to the centered electrode. The time varying voltage can be configured to increase ion throughput down the AFT to the downstream detector compared to when the electrode is at the same DC potential as the tube. In some examples, the time varying voltage is a square wave voltage. It has also been observed that the ability to manipulate ions is more pronounced at slower flows down the tube.

In some examples, the adjusted electric field gradients for the AFT-IMS and the time varying voltage applied to an AFT center electrode work in concert to manipulate ions at atmospheric pressure and increase an ion signal at a detector. Without being bound by any particular theory, it is proposed that the adjusted electric field gradients between the AFT and IMS cause the ions to become focused more toward the axial center as the ions travel down the tube and through the IMS and/or there is improved ion extraction from the AFT to the IMS. For AFT configurations with a time varying voltage applied to a central electrode, the alternating electric fields in the flow tube are thought to cause oscillation in the ion which results in greater ion densities as the ions flow down the tube, as opposed to the ions being lost through diffusion to the walls of the tube.

A consistent challenge in the IMS and MS area is the ability to control or manipulate ions at atmospheric pressure. Past attempts to trap ions at atmospheric pressure have not been as highly impactful in improving ion signal. For many attempts aimed at enhancing sensitivity, however, the omission of using counterions to balance space charge effects reduced the intended effectiveness, and software algorithms were required to compensate for peak broadening. Recent progress has been made, as Iyer et al. have recently demonstrated ion "steering" where the controlled use of counterions can be used to enhance ion signals. Atmospheric pressure ion focusing has been demonstrated by employing nonlinear DC voltage sequences in the drift region of an IMS as well.

Operating instruments at atmospheric pressure can enable smaller size instruments and real-time detection of chemical threats, such as explosives, illicit drugs, and chemical weapons, for national security. Ion manipulation and increased ion signal at atmospheric pressure would enable enhanced sensitivity with smaller, more portable devices that are critical for improving detection of chemical threats. The observations here could result in mass spectrometry and ion mobility spectrometry instrumentation improvements, such as for instruments used at airport and mass transit screening checkpoints.

IMS, AFT, and Combined AFT-IMS Examples

FIG. 1A shows a drift tube electrode arrangement 100 that includes a plurality of electrodes 102a-102l arranged to form an electrode sequence 104. In representative examples, the electrode arrangement 100 is part of an ion mobility spectrometer (IMS). The electrode sequence 104 extends along an ion propagation axis 106 between an ion inlet 108 and an ion outlet 110 and defines an interior volume 112 through which ions 114 can propagate. For example, the ions 114 can be directed into the ion inlet 108 from an ion source or other device such as an atmospheric flow tube. Such a source or device typically is configured to define a field free region proximate the coupling location to the electrode arrangement 100, or more typically a field-free region throughout the device. The electrodes 102a-102l can be configured to receive respective voltages that provide an electric field in the volume 112. For example, one or more voltage sources 115 can be coupled to the electrodes 102a-102l to supply the different respective voltages. The electric field is configured as a gradient that urges the ions 114 to travel through the volume 112 towards the ion outlet 110. In various examples, the ion outlet 110 can be coupled to another ion detection device, such as an ion mobility detector, Faraday plate, mass spectrometer, etc.

In many examples, the electrodes 102a-102l are equally spaced along the ion propagation axis 106, though other spacings are possible. In many examples, the electrodes 102a-102l are ring-shaped, though other shapes and geometries are possible. In many examples, the electrode arrangement 100 can define the ion propagation axis 106 to be straight, though other bent or curved shapes can be possible. In many examples, the electrode arrangement 100 can be rigidly structured with a rigid support, though flexible arrangement can be possible. During operation, the ions 114 can be urged through the volume 112 at atmospheric pressure with the gradient, though in various examples, vacuum can be applied and/or gas can be used to assist with movement of the ions 114 towards the ion outlet 110.

Figure 1B:
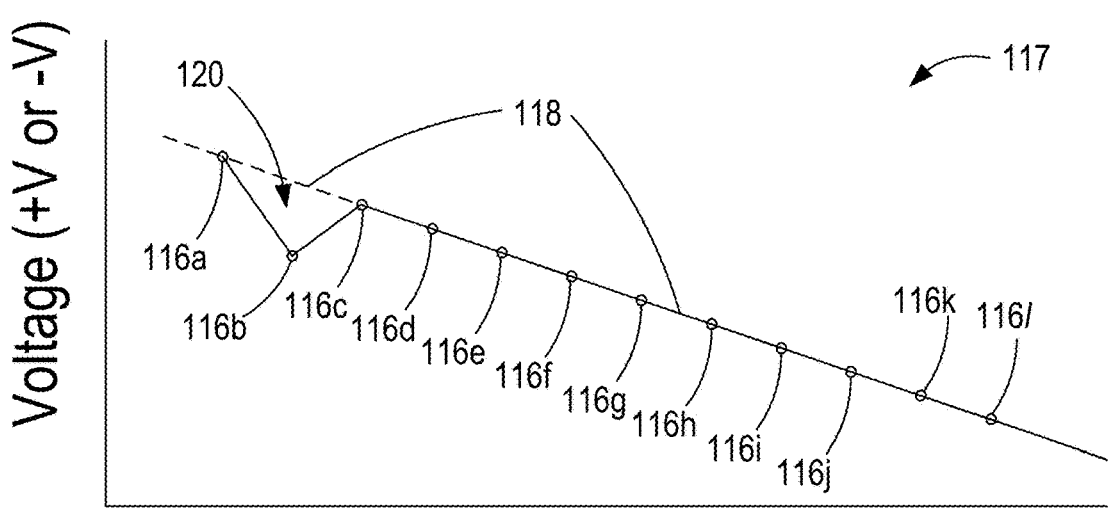
FIG. 1B is a graph of applied voltage to the electrode sequence of FIG. 1A.

FIG. 1B is a graph 117 of voltage with respect to electrode position during operation of the electrode arrangement 100. The vertical axis of graph 117 is labeled (+V or −V) to show that the voltage shown is with respect to a polarity of ions moved, such that the vertical axis shows a positive voltage or alternatively a reverted axis with a negative voltage. The horizontal axis of graph 117 generally corresponds to a ground or zero voltage though it can correspond to other non-zero voltages as discussed further below. As shown, the position of the individual electrodes 102a-102l in FIG. 1A which are equally spaced, tracks to the positions in FIG. 1B. The electrodes 102a-102l can be configured to receive respective voltages 116a-116l according to one or more functions that decrease with respect to a polarity. For example, for arrangements that begin with a positive voltage and decrease in voltage to urge positive ions towards the ion outlet 110, the one or more functions can decrease and become less positive. Alternatively, for example, for arrangements that begin with a negative voltage and increase in voltage to urge negative ions towards the ion outlet 110, the one or more functions can increase and become less negative. In a specific example, a function V(x)=5000-500x can be applied to urge positive ions in the +x direction and the function −V(x) can be applied to urge negative ions in the +x direction. While functions may be described in the context of urging ions of a selected polarity, it will be appreciated that any of the disclosed examples can also include counterions of different polarities, which may be used in some instances to advantageously increase signal strength of detection of the ions of the selected polarity.

In an illustrative example, electrodes 102a, 102c-1021 can be configured to receive voltages according to a function 118, which can be linear as shown, as well as other shapes. The electrode 102b receives a voltage 116b that is lower than a corresponding voltage of the function 118 at its position in the electrode sequence 104. This lower voltage forms a voltage dip 120 that alters the electric field within the volume 112. Voltage dips can be provided in relation to the polarity of the intended ions to be urged. For example, when urging positive ions along the +x direction, a voltage that is applied to dip or intermediate electrodes (such as electrode 102b) is smaller than a voltage that would be applied if the electrode were to receive a voltage according to the function 118. Similarly, when urging negative ions along the +x direction, a voltage that is applied to dip or intermediate electrodes is larger (less negative) than a voltage that would be applied if the electrode were to receive a voltage according to the function 118. For both positive and negative voltage gradient functions, a voltage dip also can be defined by a larger absolute value of the first derivative of the linear (or other) function defining the gradient for other electrodes of the sequence, at the transition from the function to the dipped voltage. It has been found that the altered electric field gradient dip can contribute to an increase in a signal strength for detection of ions that exit the ion outlet 110 and are received by a downstream ion analyzing device.

As shown in FIG. 1B, the positive voltage that decreases or negative voltage that increases does not cross ground voltage and therefore remain positive or negative, respectively. In some examples, the decreasing positive voltages or increasing negative voltages can cross the ground plane and respectively become negative (e.g., for gradients that start at positive voltages and that urge positive ions) or positive (e.g., for gradients that start at negative voltages that urge negative ions). For example, the horizontal axis in FIG. 1B can correspond to a non-zero voltage.

In some examples, the voltage dip 120 is situated at or near the ion inlet 108 and the voltage dip is configured to extract ions from a position upstream, e.g., by projecting electrical field lines to a field free region of an adjacent upstream atmospheric flow tube. In some examples, the voltage dip 120 is operable to direct the ions towards the propagation axis as the ions are urged along the ion path to focus the ions and reduce a loss associated with propagation through the volume 112.

As shown the voltage dip 120 is defined in relation to a subset of three electrodes of the electrode sequence 104, i.e., respective electrodes 102a-102c, with electrode 102a corresponding to a first electrode of the subset, electrode 102c corresponding to a last electrode of the subset, and electrode 102b corresponding to an intermediate electrode of the subset. In further examples more than three electrodes may be used, e.g., with multiple intermediate electrodes defining the voltage dip 120.

As shown, the function 118 is linearly decreasing but other voltage gradients may be used, such non-linear ones. For example, non-linear profiles disclosed in U.S. Publ. 2021/0239650 to Hollerbach et al. (hereby incorporated by reference herein) may be used in some examples.

The electrode arrangement 100 can further include a transmissive electrode 122 positioned downstream from the electrode 102*b* having its dipped voltage characteristic. For example, the transmissive electrode 122 can be situated at the electrode 102*c*. The transmissive electrode 122 can be configured to receive a voltage according to the function 118 based on its axial position along the ion propagation axis 106. For example, with the transmissive electrode 122 positioned at the electrode 102*b*, the electrode 102*b* and the transmissive electrode 122 can receive a common voltage. In some examples, the transmissive electrode 122 can be configured to receive other voltages, e.g., a gating or shutter voltage or voltages that prevents the ions 114 from propagating past the transmissive electrode 122. In further examples, the transmissive electrode can be situated at another downstream electrode position or its own downstream position. The transmissive electrode 122 can extend laterally across the volume 112, e.g., perpendicular to the ion propagation axis 106 so that it defines a planar electric field across volume 112 but also allows transmission of ions through the transmissive electrode 122. It has been found that, when coupled with the voltage dip 120, producing the planar electric field across the volume 112 downstream from the voltage dip 120 can contribute to an increase in a signal strength for detection of the ions 114 that exit the ion outlet 110 and are received by a downstream ion analyzing device.

In representative examples, the transmissive electrode 122 can be a mesh, screen, or grid. The transmissive electrode 122 can be made in various ways such as with spaced apart or adjoining layers of conductive wires. Various patterns or shapes can be used, including various repetitive polygons, such as hexagonal (honeycomb), rectangular, square, diamond, etc. In some examples, the transmissive electrode 122 is coupled to or contiguous with another electrode, such as the electrode 102*c*. In some examples, the transmissive electrode 122 can have different electrode portions coupled to receive different voltages, e.g., for operation as a Bradbury-Nielsen shutter.

Figures 2A, 2B:
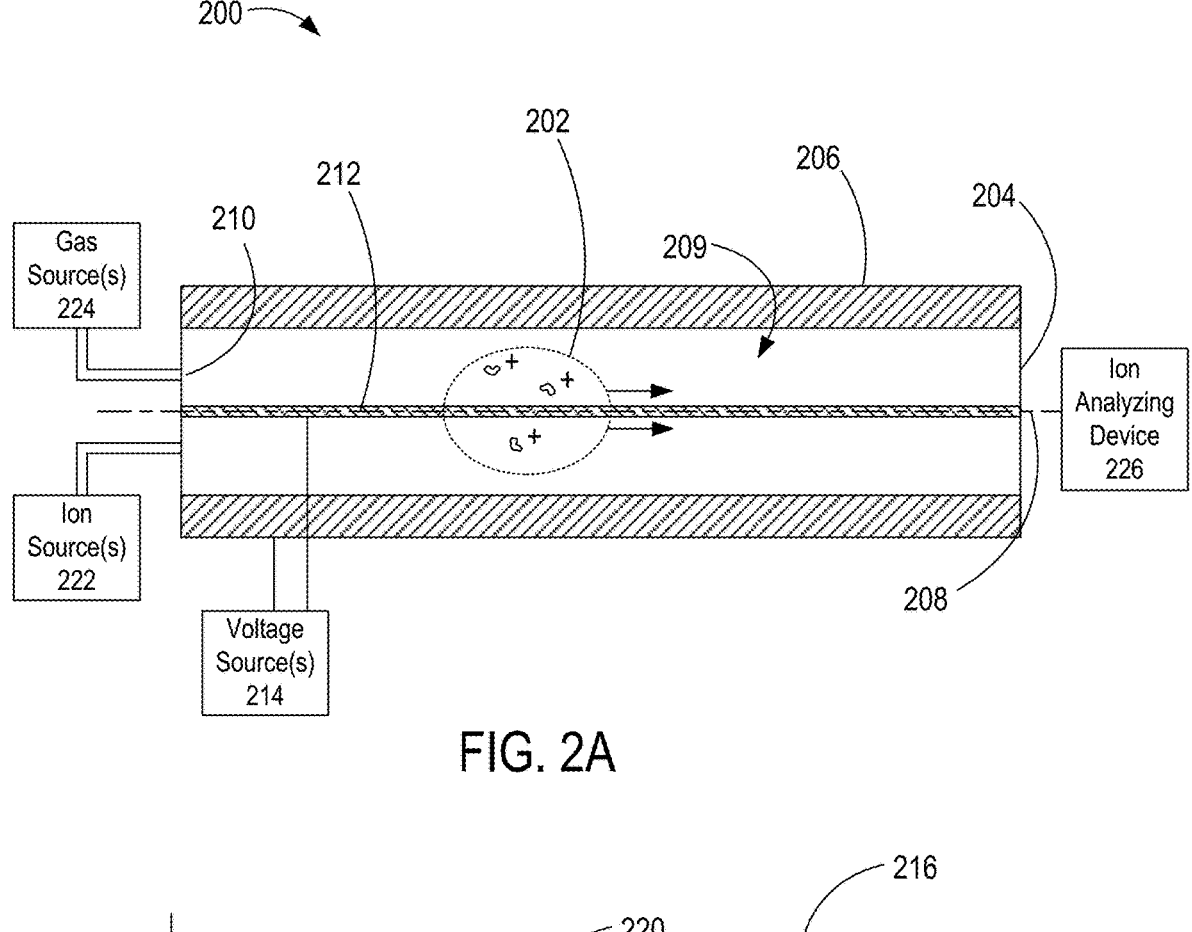
FIG. 2A is a side cross-section view of an atmospheric flow tube.
FIG. 2B is a graph of time varying voltage applied to a center electrode of the atmospheric flow tube (AFT) shown in FIG. 2A.

FIG. 2A is an atmospheric flow tube 200 that can be used to transport ions 202 to a flow tube outlet 204. The flow tube 200 includes a tube body 206, e.g., having a cylindrical form, that extends along a flow tube axis 208 and defines an interior volume 209. The flow tube 200 can include one or more flow tube inlets 210 for injecting gas, ions, or gas/ion mixtures into the flow tube 200. The flow of gas causes the injected ions to move along the flow tube 200. The flow tube 200 further includes an electrode 212 that can be centrally positioned, e.g., situated coaxially with the flow tube axis 208, to extend along at least a portion of the length of the flow tube 200. The electrode 212 can be made of wire in some examples.

One or more voltage sources 214 can be coupled to the tube body 206 to provide a common voltage to the tube body 206 (or other portion of the flow tube 200) along the length of the flow tube so as to define a field free region within the interior volume 209. The electrode 212 can also be coupled to the one or more voltage sources 214 to receive the common voltage. In representative examples, the electrode 212 can receive a separate, time varying voltage, such as time varying voltage 216 shown in the graph 218 in FIG. 2B. The time varying voltage can be configured to reduce a loss of the ions 202 as the ions 202 are transported from the flow tube inlets 210 to the flow tube outlet 204. In some examples, the time varying voltage 216 is the form of a square wave, though other shapes are possible. It has been found that for many examples, sinusoidal, sawtooth, and many other waveforms produce little or no signal improvement. The time varying voltage is centered about a center voltage 220 applied to the tube body 206. In some examples, the center voltage 220 is a ground voltage, but other positive or negative voltages can be suitable. The center voltage 220 is shown as a positive voltage in FIG. 2A. For smooth operation, the time varying voltage can be selected so that it has equal time-voltage area products above and below the voltage applied to the tube body 206. In some examples, the time varying voltage can satisfy such a constraint while having an asymmetric shape across the center voltage 220, e.g., by varying voltage amplitude and duration on either side of the center voltage 220. Various duty cycles can be employed for the time varying voltage, and time-varying voltages need not be periodic in all examples. In various examples, square-wave or other waveforms can have frequencies in the range of about 10 Hz to about 10 kHz, though other frequencies may be suitable. In various examples, square-wave or other waveforms can have voltage amplitudes in the range of about 10 mV to about 10 kV, though other voltage amplitudes may be suitable.

One or more ion sources 222 and gas sources 224 can be coupled to the flow tube inlet or inlets 210 to provide the ions 202 to be analyzed and the gas for moving the ions along the flow tube 200. The flow tube outlet 204 can be coupled to various ion analyzing devices 226, such as a mass spectrometer, ion mobility spectrometer, ion detector, etc. In selected examples, the flow tube outlet 204 is coupled to the ion inlet of an electrode arrangement of an ion mobility spectrometer, such as the electrode arrangement 100 shown in FIGS. 1A-1B. In representative examples, a first electrode of the electrode arrangement to which the flow tube 200 is coupled is at a common voltage as the tube body 206.

Figure 3A:
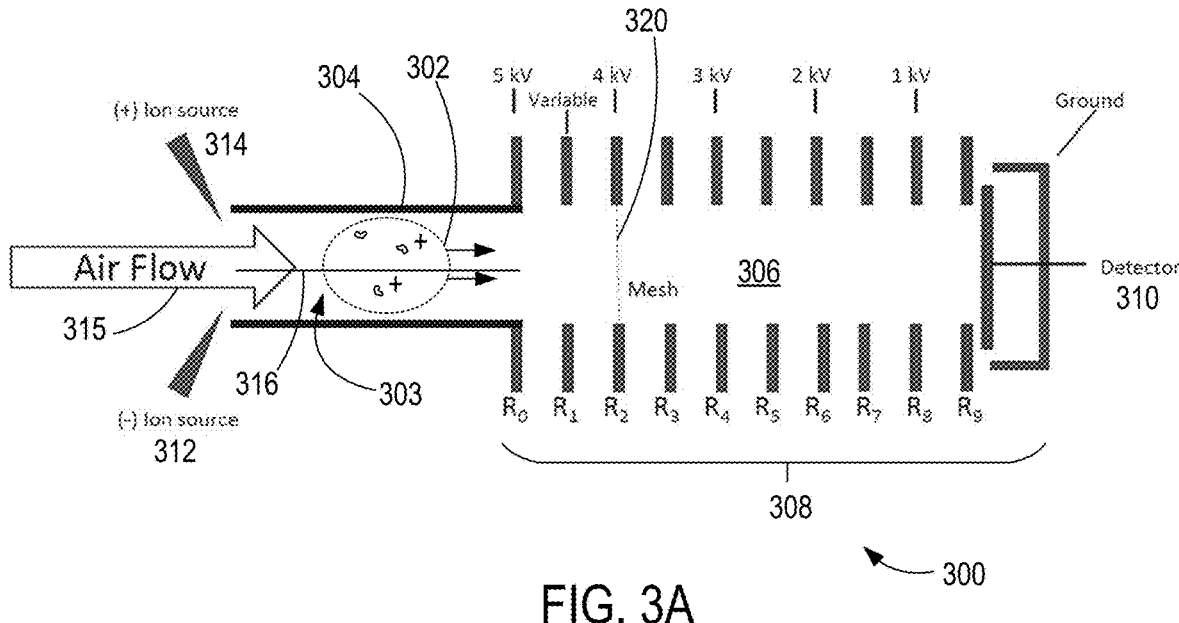
FIG. 3A is a side cross-sectional view of an AFT-IMS.

FIG. 3A is an example ion mobility spectrometer system 300 in which ions 302 are extracted and/or focused from a field-free region 303 of an atmospheric flow tube 304 into a volume 306 of an IMS electrode arrangement 308. The IMS electrode arrangement 308 is configured to separate ions based on mobility for subsequent detection and/or analysis by a downstream device, such as a detector 310, mass spectrometer, etc. The ions 302 can include negative ions, positive ions, or both negative and positive ions. In some examples, background or reactive ions can be injected with respective ion sources 312, 314. A gas 315 can be directed into the flow tube 304 that includes an analyte. As the reactive ions and analyte mix and collide during movement through the field free region 303, the analyte can ionize, e.g., causing ions and neutral particles coming together to form the ions 302, which are of interest for detection. The ions 302 can then be formed and carried into the volume 306.

The flow tube 304 can provide a longer reaction time between the ions 302 and analyte thereby increasing the probability that the two will react to form the ions 302. For example, increasing reaction time from a millisecond to a second can provide a sensitivity increase of three orders of magnitude. However, as an ion cloud expands as it moves down the flow tube 304, the ions can be lost against a tube wall and become neutralized, thereby decreasing the total number of the ions 302 reaching a downstream detection device and decreasing the detection signal. Thus, a tradeoff can exist where the increased reaction time increases sensitivity to individual analytes but the total number of ions arriving at the detection device decreases. Eventually, the noise level overcomes the detection of the ions 302 of interest and thus various ways to exploit the reaction time, such as an infinitely long tube or slower ion movement, might no longer provide a benefit.

In some examples, the flow tube 304 can include a center electrode 316 that is configured to receive a time varying voltage, such as a square-wave or other waveform. The time varying voltage can provide voltage pulses or oscillations about a center voltage common with a voltage of a body of the flow tube 304. The time varying voltage is configured to reduce a dispersal of the ions 302 as the ions move along the flow tube 304 by a redirecting of the ions 302 towards a center longitudinal axis of the flow tube 304.

Figure 3B:
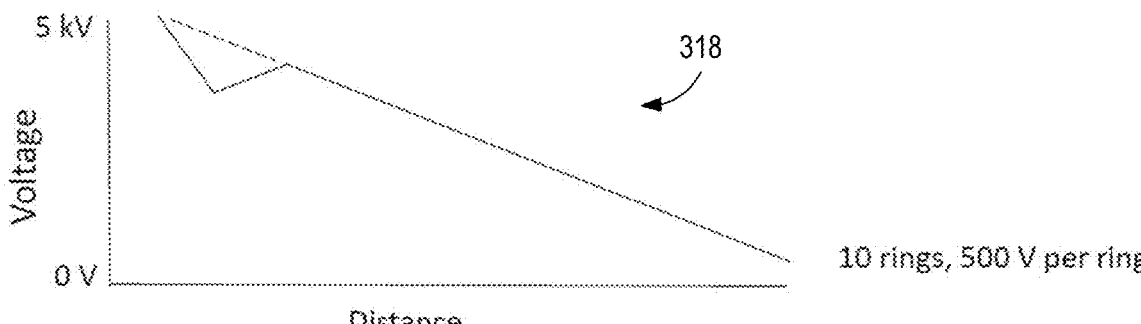
FIG. 3B is a graph of example voltages applied to the IMS portion of the AFT-IMS shown in FIG. 3A.

The IMS electrode arrangement 308 is coupled to the flow tube 304 to receive the ions 302. In a selected experimental example, the IMS electrode arrangement 308 included ten electrodes $R_0$-$R_9$ and the voltages applied to many of the electrodes decreased according to a linear function with respect to the position of the electrodes, e.g., 5 kV for $R_0$, 4 kV for $R_2$, 3.5 kV for $R_3$, and so on. Unexpectedly, it was found that by decreasing the voltage applied to the second electrode $R_1$ of the sequence of electrodes $R_0$-$R_9$ to a voltage that is below an adjacent downstream electrode $R_2$, an enhancement of the detection signal of the ions 302 was obtained at the detector 310. FIG. 3B shows a representative graph 318 of the voltage applied to the electrodes $R_0$-$R_9$.

A mesh electrode 320 can be situated downstream from the electrode $R_1$ configured to receive the dipped voltage. For example, the mesh electrode 320 can be situated at the position of $R_2$. The mesh electrode 320 can be provided with the voltage applied to $R_2$ (e.g., 4 kV) and can assist with the signal enhancement obtained with the dipped voltage applied to $R_1$.

Figure 4:
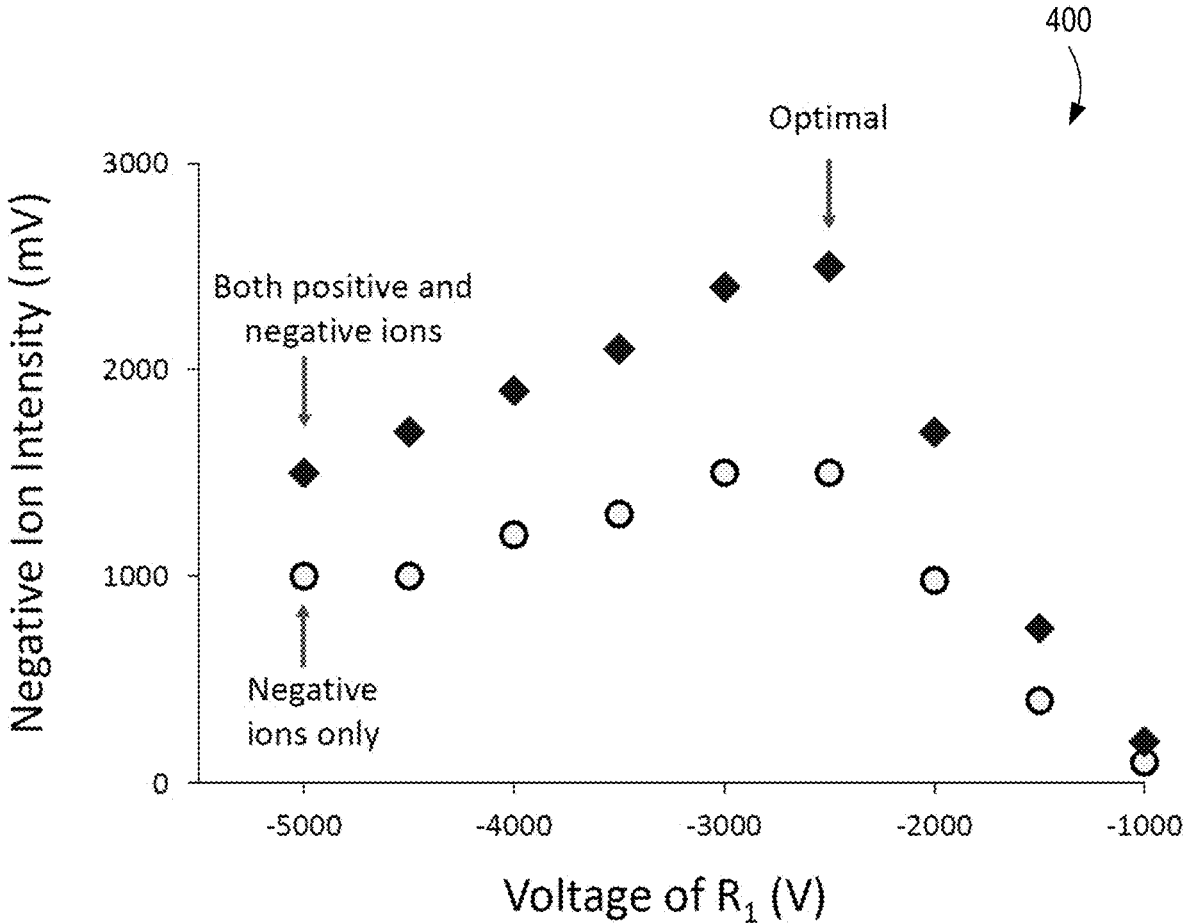
FIG. 4 is a graph of negative ion intensity with respect to voltage applied to a dipped voltage electrode.

FIG. 4 is a graph 400 showing performance improvement data for a prototype AFT-IMS example, such as the ion mobility spectrometer system 300. A linear voltage gradient was applied to a sequence of ten equally spaced electrodes $R_0$-$R_9$ such that the voltage decreased linearly with respect to its polarity for $R_0$ and $R_2$-$R_9$ in the direction increasing electrode number. In this instance, the voltage gradient began strongly negative to urge negative ions. Thus, the first electrode $R_0$ was at −5000 V, $R_2$ was at −4000 V, and $R_3$-$R_8$ increased by 500 V until $R_9$ was at 0 V. However, the voltage applied to the second electrode $R_1$ was variable. The graph 400 shows ion measurements where the electric field of $R_1$ was adjusted in relation to the linear voltage gradient while maintaining $R_0$ and $R_2$-$R_9$ as stated above, including an instance in which $R_1$ was energized to −5000 V to effectively form a hump in the linear voltage gradient rather than a dip. As shown, with only negative ions delivered to an AFT portion of the AFT-IMS with a corona discharge ionization source, there was found an optimal $R_1$ voltage between −3000 and −2500 V, with detected negative ion intensity of approximately 1500 mV. The addition of counterions (positive ions) resulted in a further enhancement in negative ion intensity. Thus, after the voltage of $R_1$ is made to decrease more quickly with respect to its polarity in relation to a gradient function that linearly decreases with respect to its polarity to form a voltage dip (i.e., in this instance, a negative voltage increases to become less negative according to a gradient function and the negative voltage increases more quickly between $R_0$ and $R_1$ to form the voltage dip), the detection signal is found to increase. The increase in signal was found to be approximately 50% and signal quality deteriorated below the signal level associated with an $R_1$ voltage of the linearly decreasing function only after the voltage was dropped with respect to its polarity to below approximately −2000 V (i.e., increased above −2000 V), a voltage amount that is applied greater than approximately half-way along the IMS electrode arrangement. An increase in signal of approximately 150% was observed where negative and positives ions were co-mingled. For example, the system can be configured to detect only one polarity, e.g., negative, but by having positive ions co-mingled, it is found that that the ions repel less. This observation may be counterintuitive, as too much attraction might cause positive and negative co-mingled ions to contact each other such that they combine and neutralize to reduce signal strength, but instead a signal increase is found.

Figure 5:
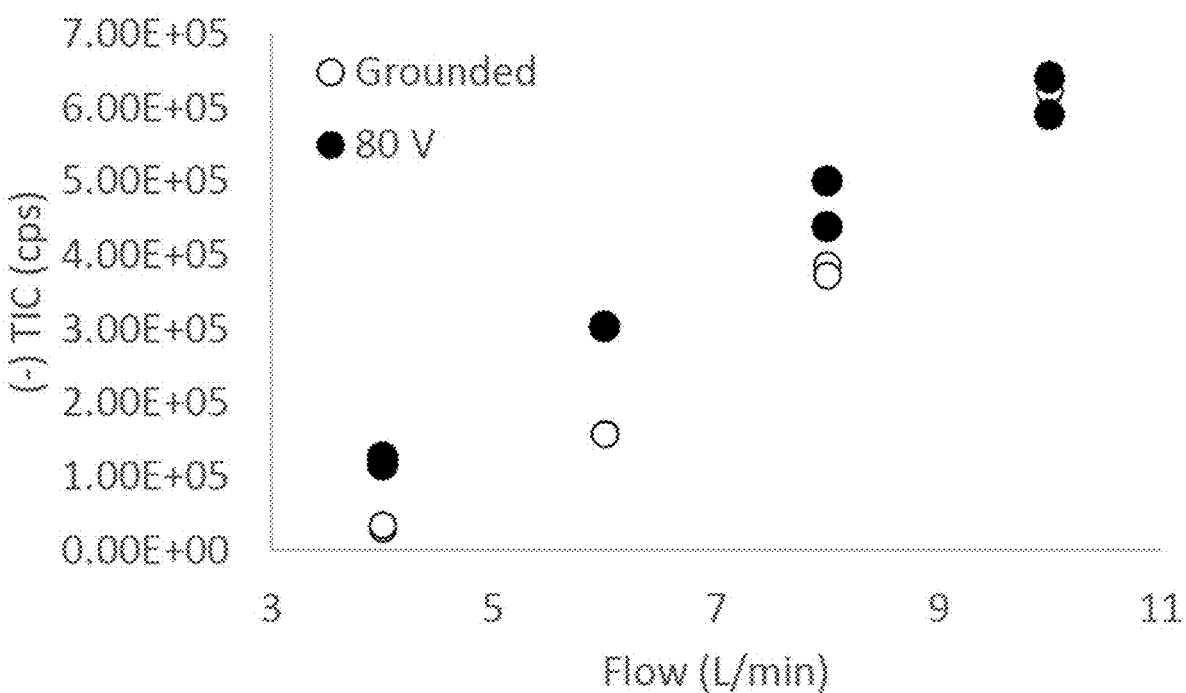
FIG. 5 is a graph of ion detection counts per second with respect to flowrate for an experimental AFT-MS example using a pulsed electric field on a center electrode.

FIG. 5 is another graph 500 showing a performance improvement for a prototype AFT-MS, such as the ion mobility spectrometer system 300 with a center electrode. Black filled circles show ion detection signal at various gas flowrates when a kHz square wave at 80 V peak-to-peak centered at ground was applied to the center electrode while the tube body was also grounded. Hollow circles show ion detection signal at the same flowrates when the center electrode was grounded and not pulsed. As flow rate was manipulated, the signal enhancement associated with the time varying voltage was more noticeable at lower flowrates. For example, at 10 L/min an ion intensity detected in a coupled mass spectrometer of approximately 600,000 counts/sec was observed with the pulsed center electrode or with the center electrode grounded. As the flowrate is reduced to 6 L/min, counts/sec were reduced due to a loss due to dispersion of the ions. However, at the slower flowrates, improved sensitivity can be obtained due to the longer reaction times. Significantly, at 6 L/min, counts/sec where the center electrode was grounded reduced to 150 k counts/sec, whereas counts/sec where the center electrode was pulsed was about twice as high at approximately 300 k counts/sec, yielding twice the signal intensity. At 4 L/min, an approximate four-times increase in signal intensity was observed with the pulsed center electrode at about 120 k counts/sec versus the grounded one at about 30 k counts/sec. Thus, at the lower flowrates a significant attenuation of the ion signal is observed compared to the higher flowrates, but the time varying voltage applied to the center electrode allowed a signal increase. As the flowrate increases, the net increase in signal is less substantial. In the selected example, the ionization source was a dielectric barrier discharge producing both positive and negative ions and, in this case, negative ions were monitored. A similar phenomenon was observed for unipolar ions, but to a lesser extent, such as when using a corona discharge ionization source.

Figures 6A, 6B:
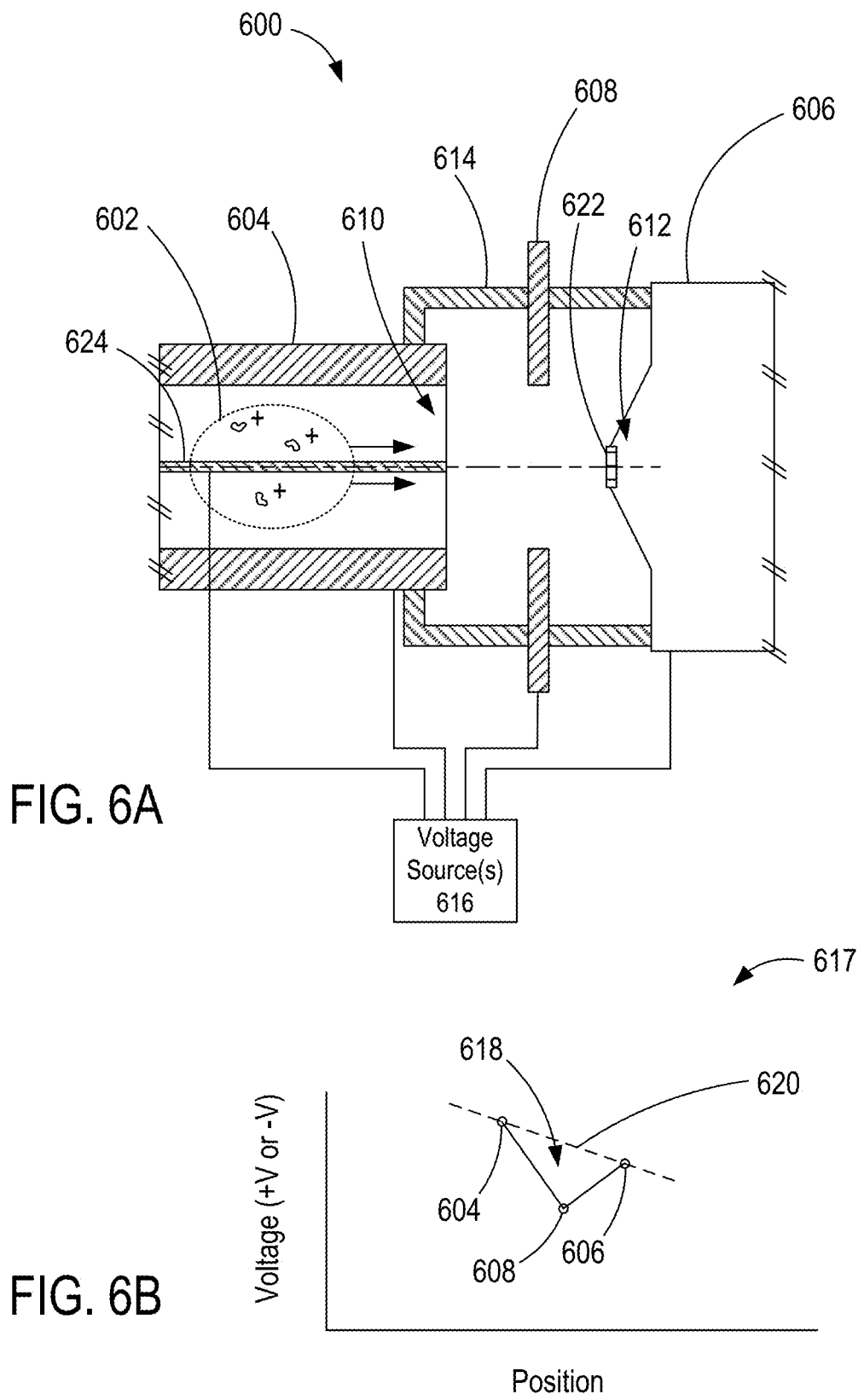
FIG. 6A is a side cross-sectional view of a coupling system that can be used to couple an AFT and an ion analysis instrument such as a mass spectrometer or an IMS.
FIG. 6B is a graph of an example electrode voltage used for the coupling shown in FIG. 6B.

FIG. 6A is an example coupling system 600 configured to couple ions 602 from an atmospheric flow tube 604 (only a portion of which is shown) to an ion analyzing device 606 (only a portion of which is shown), such as a mass spectrometer. The coupling system 600 includes a set of one or more coupling electrodes 608 (one shown) configured to be disposed between an outlet 610 of the flow tube 604 and an inlet 612 of the ion analyzing device 606. The coupling system 600 can include a support 614 that can be coupled to the electrodes 608 to provide a suitable connection and spacing between the flow tube 604 and the ion analyzing device 606.

One or more voltage sources 616 can be coupled to the electrodes 608, the flow tube 604, and/or the ion analyzing device 606. As shown with additional reference to the graph 617 in FIG. 6B, the one or more electrodes 608 are configured to receive a dipped voltage 618 relative to a decreasing voltage function 620 applied to the flow tube 604 at the outlet 610 and the ion analyzing device 606 at the ion inlet 612. In some examples, a transmissive electrode 622 such as a conductive screen or mesh is situated at the ion inlet 612 and configured to receive the voltage applied to the ion analyzing device 606 at the ion inlet 612. In some examples, the flow tube 604 can include a center electrode 624 configured to receive a time varying voltage. The voltage dip 618, transmissive electrode 622, and/or time varying voltage applied to the center electrode 624 can be configured to increase an ion analysis signal of the ion analyzing device 606. The dipped voltage 618 can remain positive (or negative) or can be negative (or positive) in some examples, as with other voltage dip examples described herein. In some examples, the dipped voltage 618 can correspond to 10%, 25%, 50%, 100%, 150%, 200%, 500%, 1000%, or more, of the voltage difference between the flow tube 604 and ion analyzing device 606. Similar percentages can be applied to the voltage dips applied in any of the other examples described herein.

Figure 7:
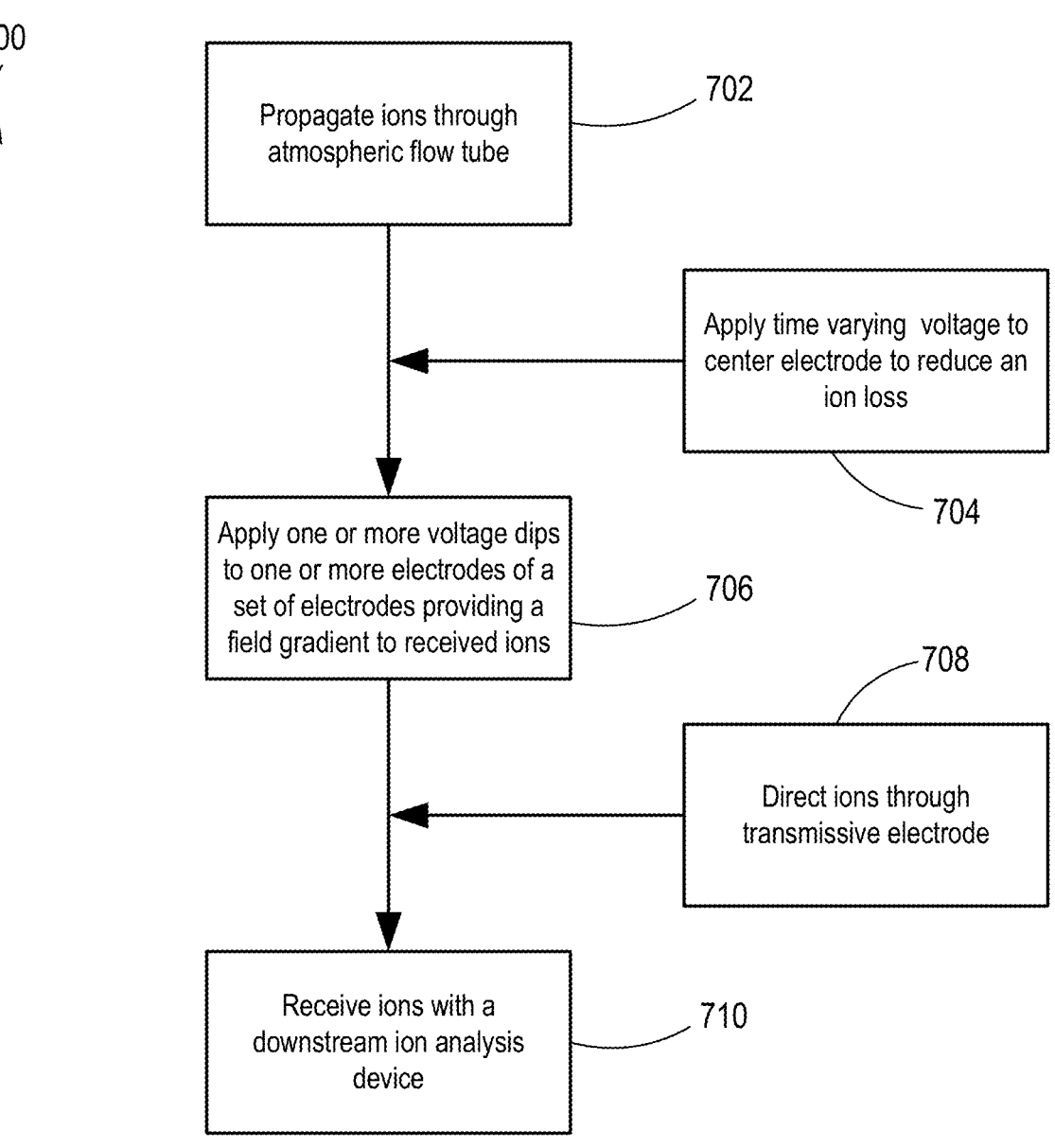
FIG. 7 is a flowchart depicting various methods in accordance with the various disclosed examples.

FIG. 7 illustrates various example methods 700 that can be used independently or combined with each other in various ways to increase an ion detection signal. In some examples, at 702, ions are directed through an atmospheric tube and at 704, a time varying voltage is applied to a center electrode of the AFT to reduce an ion dispersion and associated ion loss as the ions propagate through the AFT. In some examples, at 706, one or more voltage dips are applied to one or more electrodes of a set of electrodes providing a field gradient to received ions. In some examples, at 708, ions are directed through a transmissive electrode after at least one of the one or more voltage dips applied at 706 with the transmissive electrode applied with a voltage associated with the field gradient at the position of the transmissive electrode. In many examples, at 710, ions are received by a downstream ion analysis device, such as a mass spectrometer or ion detector and a signal improvement is observed.

Figures 8, 9, 10:
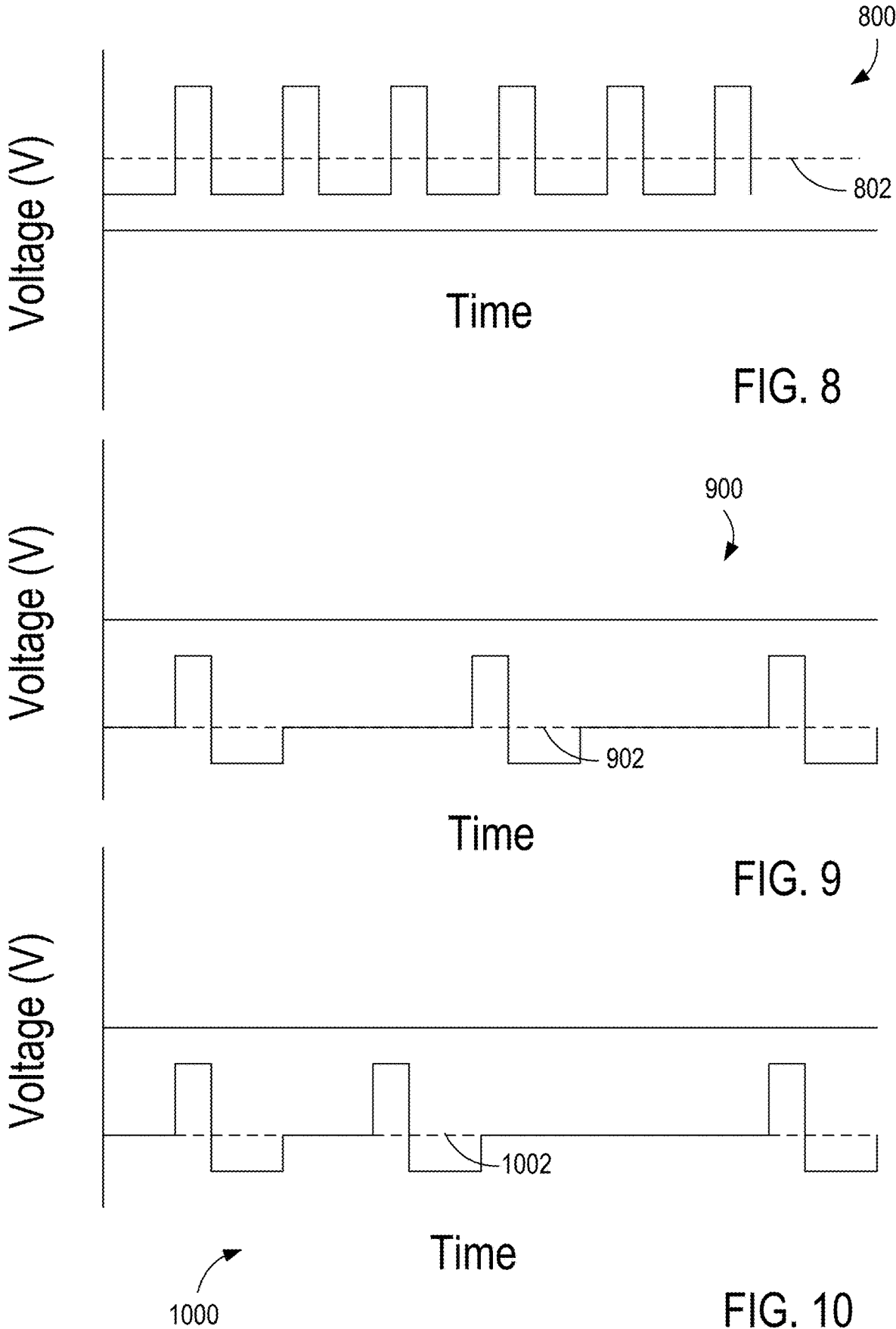
FIGS. 8-10 are graphs of voltage with respect to time for various example waveforms that can be applied to a center electrode of various disclosed AFTs.

FIGS. 8-10 show example voltage waveforms 800, 900, 1000 that can be applied to different example central wire atmospheric flow tubes. The voltage waveform 800 is asymmetrically shaped about a center voltage 802 but the area-products above and below the center voltage 802 are equal. The voltage waveform 900 has equal area-products above and below a center voltage 902 and pulses are spread to define a decreased duty cycle. The voltage waveform 1000 has equal area-products above and below a center voltage 1002 and pulses arrive to define different periods.

Figure 11:
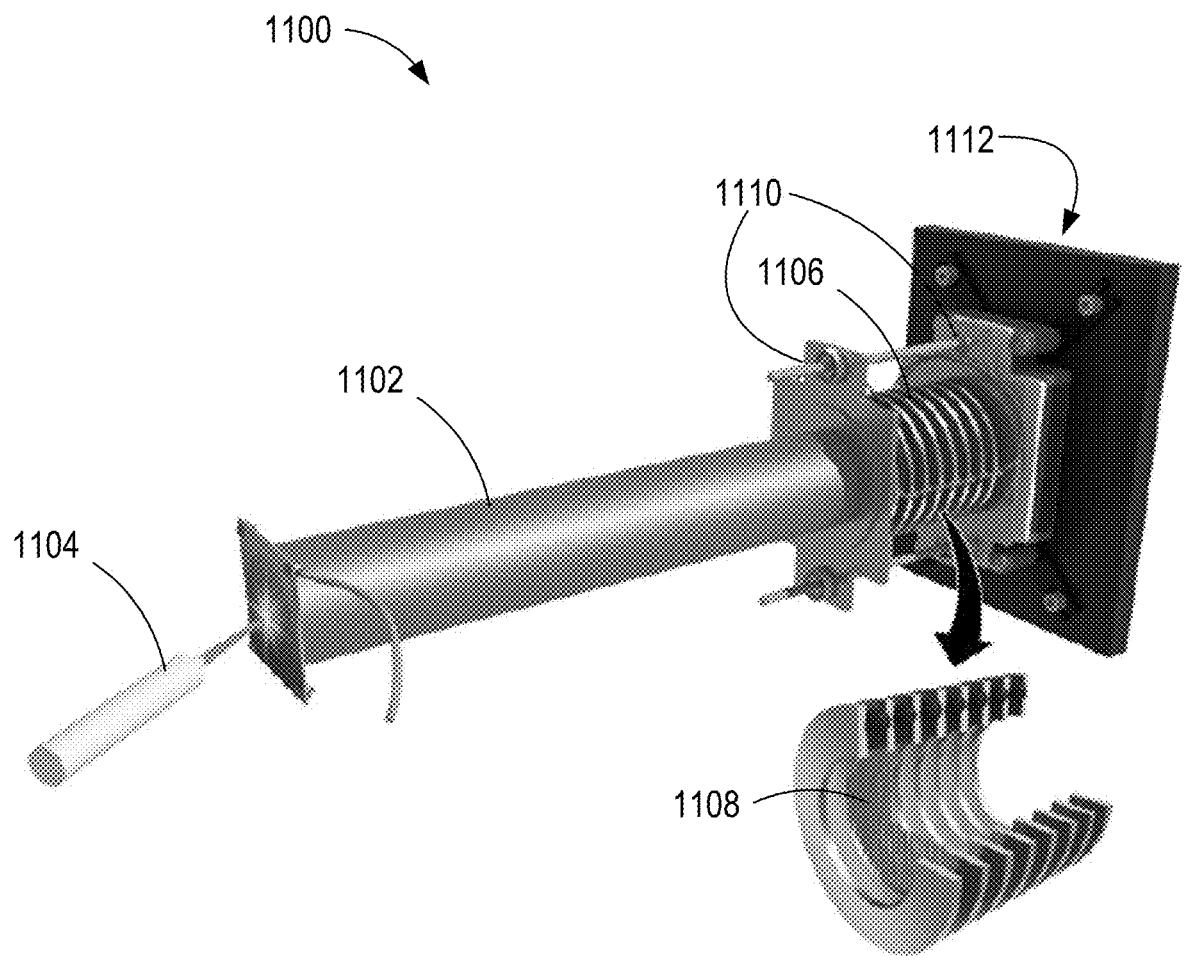
FIG. 11 is a perspective view of an example AFT-IMS system or AFT/MS coupling arrangement.

FIG. 11 shows an ion analysis system 1100 that includes an AFT 1102 situated to receive ions from an ion source 1104, an IMS drift tube electrode arrangement 1106 situated to receive the ions from the AFT 1102, and a downstream ion detection system 1112 situated to receive the ions from the IMS electrode arrangement 1106. An exploded ¾ cross-section shows a mesh electrode 1108 extending across an electrode from a preceding electrode. The preceding electrode is configured to provide a voltage dip relative to a voltage gradient applied by the other electrodes of the IMS electrode arrangement. A rigid support system 1110 is configured to couple the AFT 1102, IMS electrode arrangement 1106, and the downstream ion detection system 1112 to provide secure transfer of ions for detection and analysis.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Having described and illustrated the principles of the disclosed technology with reference to the illustrated embodiments, it will be recognized that the illustrated embodiments can be modified in arrangement and detail without departing from such principles. For instance, elements of the illustrated examples can be implemented in software and/or in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

We claim:

1. An apparatus, comprising:
   a plurality of electrodes arranged in a sequence along a propagation axis between an ion inlet and an ion outlet to define an ion path and volume and including a sequence first electrode, wherein the electrodes are configured to receive respective voltages to produce an electric field in the volume that urges ions to propagate along the ion path downstream towards the ion outlet;
   wherein the sequence includes at least a first sequence portion including a first sequence portion first electrode and a first sequence portion last electrode configured to receive respective voltages according to a first function wherein either (i) at least the sequence first electrode receives a positive voltage and the first function decreases to become less positive or (ii) the sequence first electrode receives a negative voltage and the first function increases to become less negative, wherein the first sequence portion includes at least one intermediate electrode situated between the first sequence portion first electrode and the first sequence portion last electrode, wherein the at least one intermediate electrode is configured to receive a voltage defining a voltage dip relative to the first function that allows transmission of ions along the propagation axis past a position of the at least one intermediate electrode defining the voltage dip and comprising either, (i) where the sequence first electrode receives a positive voltage, a lesser voltage than a voltage that would be applied according to the first function at the intermediate electrode position, or, (ii) where the sequence first electrode receives a negative voltage, a greater voltage than a voltage that would be applied according to the first function at the intermediate electrode position.

2. The apparatus of claim 1, wherein the voltage defining the voltage dip is configured to increase a signal strength for detection of ions that exit the ion outlet and are received by a downstream ion analyzing device.

3. The apparatus of claim 1, further comprising an atmospheric flow tube comprising:

a tube body extending from one or more flow tube inlets to a flow tube outlet and defining a flow tube volume extending along a flow tube axis, wherein the one or more flow tube inlets are configured to direct gas and ions into the flow tube volume and wherein the flow tube outlet is coupled to the sequence of electrodes through the ion inlet.

4. The apparatus of claim 3, wherein the tube body and the sequence first electrode are configured to receive a common voltage.

5. The apparatus of claim 3, wherein the tube body comprises the sequence first electrode.

6. The apparatus of claim 3, further comprising a central electrode arranged longitudinally along the flow tube axis and configured to receive a time varying voltage configured to reduce a loss of ions as the gas and ions flow along the flow tube volume to the flow tube outlet.

7. The apparatus of claim 6, wherein the central electrode comprises a wire electrode.

8. The apparatus of claim 6, wherein the time varying voltage comprises a square wave.

9. The apparatus of claim 6, wherein the time varying voltage comprises a waveform having equal time-voltage area products above and below a voltage applied to the tube body.

10. The apparatus of claim 9, wherein the waveform is asymmetrically shaped with respect to the voltage applied to the tube body.

11. The apparatus of claim 3, further comprising one or more ion sources coupled to one or more of the flow tube inlets.

12. The apparatus of claim 1, wherein the first sequence portion first electrode comprises a first sequential electrode and the first sequence portion last electrode-comprises a third sequential electrode, and the at least one intermediate electrode of the first sequence portion comprises a second sequential electrode.

13. The apparatus of claim 1:

wherein the first sequence portion first electrode corresponds to the sequence first electrode situated at or near the ion inlet, or wherein the first sequence portion first electrode corresponds to another electrode of the sequence situated downstream from the sequence first electrode.

14. The apparatus of claim 1, further comprising at least one additional sequence portion including first and last additional electrodes configured to receive voltages according to the first function and including at least one additional intermediate electrode situated between the first and last additional electrodes wherein the at least one additional intermediate electrode is configured to receive a voltage defining an additional voltage dip relative to the first function.

15. The apparatus of claim 14, wherein the first sequence portion last electrode and the first additional electrode of the additional sequence portion are the same electrode.

16. The apparatus of claim 1, further comprising a transmissive electrode positioned downstream from the at least one intermediate electrode of the first sequence portion, wherein the transmissive electrode extends laterally with respect to the propagation axis across the volume to define a planar electric field across the volume.

17. The apparatus of claim 16, wherein the transmissive electrode comprises a mesh, screen, or grid.

18. The apparatus of claim 16, wherein the transmissive electrode comprises a pattern of polygonal shapes.

19. The apparatus of claim 16, wherein the transmissive electrode is coupled to or contiguous with the first sequence portion last electrode.

20. The apparatus of claim 16, wherein the transmissive electrode is configured to receive an alternative voltage and operate as an ion shutter that prevents ions from propagating downstream from the transmissive electrode.

21. The apparatus of claim 16, wherein the transmissive electrode is configured to receive the voltage according to the first function according to its position in the sequence so as to produce the planar electric field across the volume and thereby increase a signal strength for detection of ions that exit the ion outlet and are received by a downstream ion analyzing device.

22. The apparatus of claim 1, further comprising an ion detector coupled to the ion outlet.

23. The apparatus of claim 1, wherein the first function comprises a linear function.

24. The apparatus of claim 1, further comprising one or more voltage sources configured to provide the voltages applied to the plurality of electrodes.

25. The apparatus of claim 1, wherein the voltage dip is configured to extract ions from a position upstream from the at least one intermediate electrode of the first sequence portion by projecting electrical field lines upstream to a field free region.

26. The apparatus of claim 1, wherein the voltage dip is configured to direct the ions towards the propagation axis as the ions are urged along the ion path.

27. The apparatus of claim 1, wherein the sequence of electrodes comprises a drift tube of an ion mobility spectrometer.

28. The apparatus of claim 1, wherein each other electrode of the sequence that is not one of the at least one intermediate electrodes has a voltage applied according to the first function.

29. An atmospheric flow tube apparatus, comprising:

a tube body extending from one or more flow tube inlets to a flow tube outlet and defining a flow tube volume extending along a flow tube axis, wherein the one or more flow tube inlets are configured to direct gas, analyte, and reactive ions into the flow tube volume to react during movement to the flow tube outlet to form ions to be detected; and a central electrode arranged longitudinally along the flow tube axis and configured to receive a time varying voltage configured to reduce a loss of the reactive ions and ions to be detected as the gas, reactive ions, and ions to be detected flow along the flow tube volume to the flow tube outlet to increase the reaction with the analyte in the flow tube volume and thereby a corresponding detection signal of the ions to be detected;

wherein the time varying voltage comprises a waveform having equal time-voltage area products above and below a voltage applied to the tube body.

30. The apparatus of claim 29, wherein the central electrode comprises a wire electrode.

31. The apparatus of claim 29, wherein the time varying voltage comprises a square wave.

32. The apparatus of claim 29, wherein the waveform is asymmetrically shaped with respect to the voltage applied to the tube body.

33. The apparatus of claim 29, further comprising one or more ion sources and/or gas sources coupled to one or more of the flow tube inlets.

34. The apparatus of claim 29, wherein the flow tube outlet is configured to couple to an ion analyzing device.

35. The apparatus of claim 34, wherein the tube body and a first electrode of the ion analyzing device are configured to receive a common voltage.

36. The apparatus of claim 29, wherein the flow tube outlet is configured to couple to an ion mobility spectrometer.

37. An atmospheric flow tube apparatus, comprising:

a tube body extending from one or more flow tube inlets to a flow tube outlet and defining a flow tube volume extending along a flow tube axis, wherein the one or more flow tube inlets are configured to direct gas and ions into the flow tube volume; and a central electrode arranged longitudinally along the flow tube axis and configured to receive a time varying voltage configured to reduce a loss of the ions as the gas and ions flow along the flow tube volume to the flow tube outlet;

wherein the flow tube outlet is configured to couple to an ion analyzing device; wherein the tube body and a first electrode of the ion analyzing device are configured to receive a common voltage.

* * * * *